US012564949B2

(12) United States Patent
Ni

(10) Patent No.:   US 12,564,949 B2
(45) Date of Patent:        Mar. 3, 2026

(54) METHOD, ROBOT AND STORAGE MEDIUM FOR ALIGNING ROBOT END WITH TARGET OBJECT

(71) Applicants: SHANGHAI FLEXIV ROBOTICS TECHNOLOGY CO., LTD., Shanghai (CN); FLEXIV LTD., Cayman Islands (GB)

(72) Inventor: Feijian Ni, Shanghai (CN)

(73) Assignees: SHANGHAI FLEXIV ROBOTICS TECHNOLOGY CO., LTD., Shanghai (CN); FLEXIV LTD. (KY)

( * ) Notice:    Subject to any disclaimer, the term of this patent is extended or adjusted under 35 U.S.C. 154(b) by 245 days.

(21) Appl. No.:    18/576,557

(22) PCT Filed:    Jun. 8, 2023

(86) PCT No.:    PCT/CN2023/099086

§ 371 (c)(1),
(2) Date:    Jan. 4, 2024

(87) PCT Pub. No.: WO2024/250221

PCT Pub. Date: Dec. 12, 2024

(65)            Prior Publication Data

US 2025/0229418 A1      Jul. 17, 2025

(51) Int. Cl.
B25J 9/16        (2006.01)
B25J 13/08        (2006.01)
(52) U.S. Cl.
CPC ........... B25J 9/1633 (2013.01); B25J 9/1687 (2013.01); B25J 13/085 (2013.01)
(58) Field of Classification Search
CPC ...... B25J 9/1633; B25J 9/1687; B25J 13/085; G05B 2219/40087
See application file for complete search history.

(56)            References Cited

U.S. PATENT DOCUMENTS

2017/0008171 A1*   1/2017  Iwatake ................. B25J 9/1633
2017/0266816 A1*   9/2017  Takeuchi ............... B25J 13/085
            (Continued)

FOREIGN PATENT DOCUMENTS

CN        102284956 A     12/2011
CN        107175672 A      9/2017
            (Continued)

OTHER PUBLICATIONS

PCT International Search Report and Written Opinion for corresponding PCT Application No. PCT/CN2023/099086, mailed Dec. 21, 2023, 7 pages.

*Primary Examiner* — Adam R Mott
*Assistant Examiner* — Sagar Kc
(74) *Attorney, Agent, or Firm* — Dority & Manning, PA

(57)            ABSTRACT

A method for aligning a robot end with a target object includes: acquiring a target direction for a surface to be aligned; selecting a control point, and establishing a coordinate system of the control point; controlling the surface to move along a direction such that the z-axis points in the target direction; rotating, when the surface is determined to be in contact with the target object, the surface with respect to the target object actively and keeping the surface in contact with the target object, and acquiring a first displacement of the control point; determining a relationship between the first displacement and the z-axis; determining, based on the relationship between the first displacement and the z-axis, whether a current rotation direction is a correct alignment direction; and controlling, based on the determination, the surface to be rotated.

14 Claims, 6 Drawing Sheets

(56) References Cited

U.S. PATENT DOCUMENTS

2018/0004188 A1 *  1/2018  Yamaguchi ................ B25J 9/16
2021/0291377 A1 *  9/2021  Tsukamoto .......... G01B 11/002

FOREIGN PATENT DOCUMENTS

CN      107322599  A     11/2017
CN      115042175  A      9/2022
CN      116140972  A      5/2023

* cited by examiner

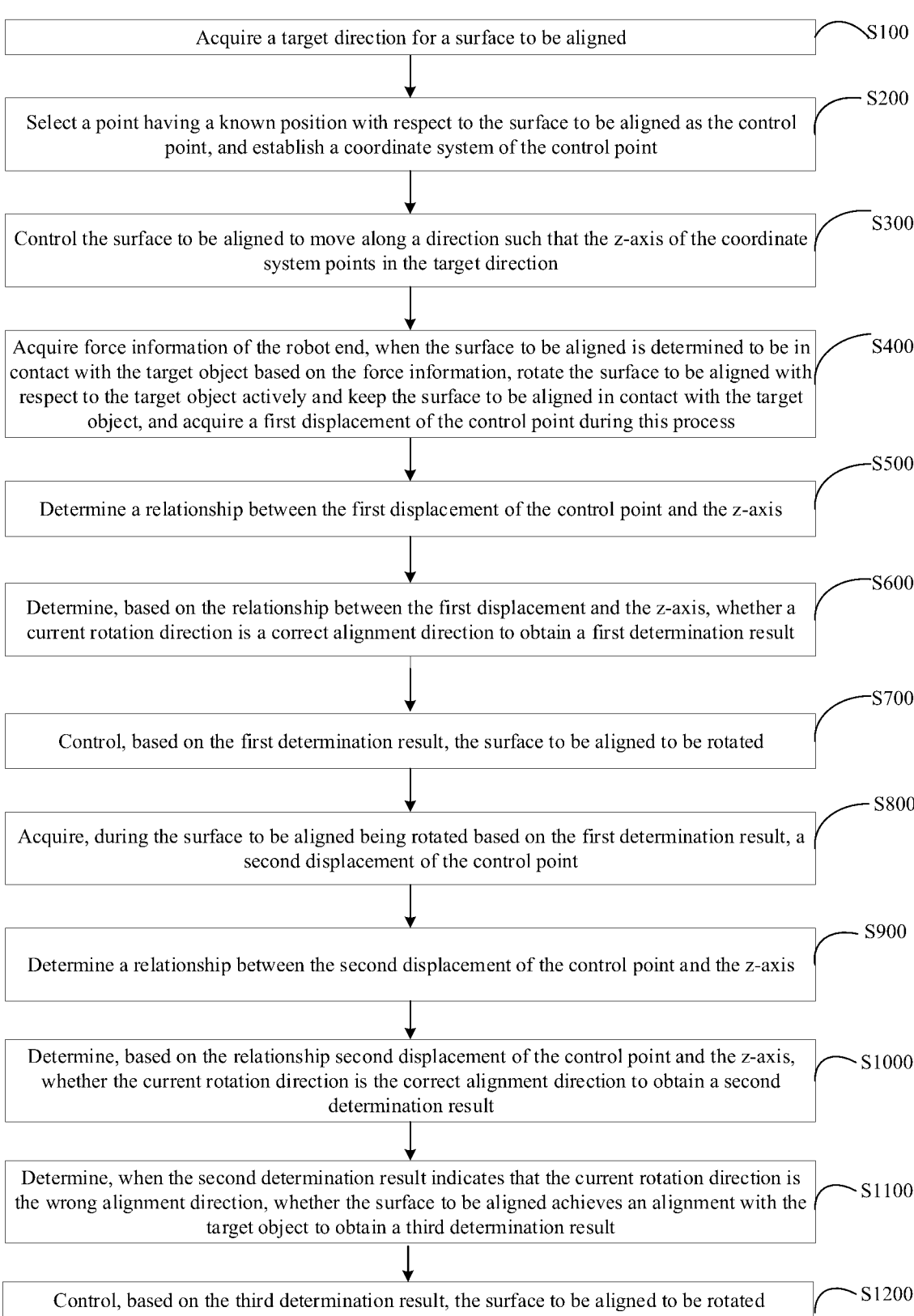

Acquire a target direction for a surface to be aligned — S100

Select a point having a known position with respect to the surface to be aligned as the control point, and establish a coordinate system of the control point — S200

Control the surface to be aligned to move along a direction such that the z-axis of the coordinate system points in the target direction — S300

Acquire force information of the robot end, when the surface to be aligned is determined to be in contact with the target object based on the force information, rotate the surface to be aligned with respect to the target object actively and keep the surface to be aligned in contact with the target object, and acquire a first displacement of the control point during this process — S400

Determine a relationship between the first displacement of the control point and the z-axis — S500

Determine, based on the relationship between the first displacement and the z-axis, whether a current rotation direction is a correct alignment direction to obtain a first determination result — S600

Control, based on the first determination result, the surface to be aligned to be rotated — S700

Acquire, during the surface to be aligned being rotated based on the first determination result, a second displacement of the control point — S800

Determine a relationship between the second displacement of the control point and the z-axis — S900

Determine, based on the relationship second displacement of the control point and the z-axis, whether the current rotation direction is the correct alignment direction to obtain a second determination result — S1000

Determine, when the second determination result indicates that the current rotation direction is the wrong alignment direction, whether the surface to be aligned achieves an alignment with the target object to obtain a third determination result — S1100

Control, based on the third determination result, the surface to be aligned to be rotated — S1200

FIG. 2

METHOD, ROBOT AND STORAGE MEDIUM FOR ALIGNING ROBOT END WITH TARGET OBJECT

CROSS-REFERENCE TO RELATED APPLICATIONS

The present application is a U.S. national phase application under 35 U.S.C. § 371 based upon international patent application No. PCT/CN2023/099086, filed on Jun. 8, 2023, the entire content of which is hereby incorporated by reference herein for all purposes.

TECHNICAL FIELD

The present disclosure relates to the technical field of industrial robots, and more particularly, to a method for aligning a robot end with a target object, and a robot and a storage medium for the same.

BACKGROUND

In industrial practice, when an industrial robot performs operation such as grabbing, assembling, etc., a robot end of the robot needs to be in contact with an operating environment or an operated object, and a certain relative position and orientation between them needs to be satisfied. That is, the posture of the robot end should be aligned with the environment or the object.

A conventional industrial robot generally controls the robot end to operate by using a pre-calibrated position, which requires the relative position and orientation between the robot end and the operated object or the operating environment to be unchanged. However, it is difficult to keep the relative position and orientation unchanged due to various factors. For example, when the robot is mounted on a moving platform, a positioning accuracy of the moving platform is generally low, resulting in a large error in the position and orientation between the operated object or the operating environment and the robot end. This may lead to a large posture deviation between the operated object (or the environment) and the robot end during operation such as grabbing, assembling, etc.

Other robots having force control characteristics and a capability of six-dimensional force (or six-dimensional torque) measurement can adjust the position and orientation by using a specific force control compliance strategy according to an external force (or an external torque) detected. But this solution requires a high detection accuracy of the external torque in order to ensure an effect of the posture compliance control. However, in practical, particularly when a size of a contact surface between the robot end and the target object is small, the external force (or the external torque) detected is generally small and vulnerable to noise interference. As a result, the effect of the posture compliance control strategy based on the detection of the external force (or the external torque) is usually not as satisfactory as it should be.

SUMMARY

An objective of the present disclosure is to provide a method, a robot and a computer readable storage medium for aligning a robot end with a target object to address a problem of the prior art.

According to a first aspect of the present disclosure, a method for aligning a robot end with a target object is provided. The method is used to adjust a posture of the robot end when the robot end is in contact with the target object. The method includes: acquiring a target direction for a surface to be aligned; selecting a point having a known position with respect to a surface to be aligned as the control point, and establishing a coordinate system of the control point having an x-axis, a y-axis and a z-axis; controlling the surface to be aligned to move along a direction such that the z-axis of the coordinate system points in the target direction; acquiring force information of the robot end, and determining whether the surface to be aligned is in contact with the target object; rotating, when the surface to be aligned is determined to be in contact with the target object based on the force information, the surface to be aligned with respect to the target object actively and keeping the surface to be aligned in contact with the target object, and acquiring a first displacement of the control point during this process; determining a relationship between the first displacement of the control point and the z-axis; determining, based on the relationship between the first displacement and the z-axis, whether a current rotation direction is a correct alignment direction to obtain a first determination result; and controlling, based on the first determination result, the surface to be aligned to be rotated.

In an embodiment, after the controlling, based on the first determination result, the surface to be aligned to be rotated, the method further includes: acquiring, during the surface to be aligned being rotated based on the first determination result, a second displacement of the control point; determining a relationship between the second displacement of the control point and the z-axis; determining, based on the relationship second displacement of the control point and the z-axis, whether the current rotation direction is the correct alignment direction to obtain a second determination result; determining, when the second determination result indicates that the current rotation direction is the wrong alignment direction, whether the surface to be aligned is aligned with the target object to obtain a third determination result; and controlling, based on the third determination result, the surface to be aligned to be rotated.

In an embodiment, the controlling, based on the first determination result, the surface to be aligned to be rotated, includes: rotating, if the alignment is not achieved, the surface to be aligned reversely until the surface S to be aligned is aligned with the target object; and stopping rotating, if the alignment is achieved, the surface to be aligned.

In an embodiment, the determining the relationship between the first displacement of the control point and the z-axis includes: calculating a first vector projection of the first displacement of the control point on the z-axis; and determining, based on the first vector projection, the relationship between the first displacement of the control point and the z-axis: if the first vector projection is positive, it is determined that the first displacement points in a same direction as the z-axis point; and if the first vector projection is negative, it is determined that the first displacement points in a direction opposite to the z-axis.

In an embodiment, the determining the relationship between the second displacement of the control point and the z-axis includes: calculating a second vector projection of the second displacement of the control point on the z-axis; and determining, based on the second vector projection, the relationship between the second displacement of the control point and the z-axis: if the second vector projection is positive, it is determined that the second displacement points in a same direction as the z-axis point; and if the second vector projection is negative, it is determined that the second displacement points in a direction opposite to the z-axis.

In an embodiment, the calculating the first vector projection of the first displacement of the control point on the z-axis includes: calculating the first displacement of the control point before and after the rotation in the base coordinate system; acquiring a vector expression of the z-axis in the base coordinate system; and acquiring a dot product of the first displacement and the vector expression of the z-axis to obtain the first vector projection of the first displacement in the z-axis.

In an embodiment, the calculating the second vector projection of the second displacement of the control point on the z-axis includes: calculating the second displacement of the control point before and after the rotation in the base coordinate system; acquiring a vector expression of the z-axis in the base coordinate system; and acquiring a dot product of the second displacement and the vector expression of the z-axis to obtain the second vector projection of the second displacement in the z-axis.

In an embodiment, when the control point is located within the surface to be aligned, the determining, based on the relationship between the first displacement and the z-axis, whether the current rotation direction is the correct alignment direction to obtain the first determination result includes: determining, if the first displacement points in a same direction as the z-axis point, the current rotation direction as the correct alignment direction; and determining, if the first displacement points in a direction opposite to the z-axis point, the current rotation direction as a wrong alignment direction.

In an embodiment, when the control point is located within the surface to be aligned, the determining, based on the relationship between the second displacement and the z-axis, whether the current rotation direction is the correct alignment direction to obtain the second determination result includes: determining, if the second displacement points in a same direction as the z-axis point, the current rotation direction as the correct alignment direction; and determining, if the second displacement points in a direction opposite to the z-axis, the current rotation direction as a wrong alignment direction.

In an embodiment, the determining whether the surface to be aligned is aligned with the target object includes: presetting a distance threshold related to a size of the surface to be aligned and a position where the control point is selected; acquiring, during the rotation, a lowest point of the control point having a lowest projection in the z-axis; and comparing current coordinates of the control point with the lowest point. When a position deviation between the control point and the lowest point is less than or equal to the distance threshold, the surface to be aligned is aligned with the target object.

In an embodiment, the acquiring the first displacement of the control point includes: presetting a first threshold related to a size of the surface to be aligned and a position where the control point is selected; and acquiring, when a position deviation of the control point before and after the rotation is greater than or equal to the first threshold $T_1$, the first displacement during the rotation.

In an embodiment, the acquiring, based on the first determination result, the second displacement of the control point during the rotation of the surface to be aligned includes: presetting a first threshold related to a size of the surface to be aligned and a position where the control point is selected; and acquiring, when a position deviation of the control point before and after the rotation is greater than or equal to the first threshold, the second displacement during the rotation.

According to a second aspect of the present disclosure, a robot is provided. The robot includes a processor and a memory having a computer program stored thereon. A method for aligning a robot end with a target object in the first aspect is implemented when the processor executes the computer program.

According to a third aspect of the present disclosure, a non-transitory computer readable storage medium on which a computer program is stored is provided. The computer program, when executed by a processor, a method for aligning a robot end with a target object in the first aspect is implemented.

According to the method, the robot and the computer readable storage medium for aligning the robot end with the target object provided in the present disclosure, the direction of rotation of the surface to be aligned relative to the target object can be determined based on the relationship between the displacement of the control point before and after the rotation and the z-axis, and the rotation of the surface to be aligned can be controlled based on the determination result. As a result, the posture alignment of the surface to be aligned with the target object is achieved. Moreover, according to the solutions of the present disclosure, the posture deviation between the surface to be aligned and the target object within a small range can be adjusted without a high-accuracy force/torque sensor, and there are advantages of a high accuracy in controlling the posture alignment, wide applicability and low cost.

BRIEF DESCRIPTION OF THE DRAWINGS

The above and other objects, features and advantages of the present disclosure will become more apparent from a more detailed description of the preferred embodiments of the present disclosure shown in the accompanying drawings. The same reference numerals refer to the same parts throughout the drawings, the drawings are not intentionally scaled to actual size, and focus on illustrating the subject matter of the present disclosure.

Other features, objects and advantages of the present disclosure will become more apparent upon reading the detailed description of non-limiting embodiments taken with reference to the following drawings:

FIG. 2 is a flow diagram illustrating the method for aligning the robot end with the target object according to an embodiment;

DETAILED DESCRIPTION OF THE EMBODIMENTS

In order to facilitate understanding of the present disclosure, the present disclosure is described more fully below with reference to the related drawings. Preferred embodiments of the present disclosure are shown in the accompanying drawings. However, the present disclosure may be implemented in many different forms and is not limited to the embodiments described herein. Rather, these embodiments are provided to enable a more thorough and complete understanding of the present disclosure.

It should be noted that when an element is referred to as being "connected" to another element, it may be directly connected to and integrated with the other element, or an intervening element may also be present. The terms "mounting", "an end", "the other end" and similar expressions used herein are for illustrative purposes only.

Unless otherwise defined, all technical and scientific terms used herein have the same meaning as commonly understood by one of ordinary skill in the technical field to which the present disclosure belongs. The terms used herein in the specification of the present disclosure are for the purpose of describing specific embodiments only, and are not intended to limit the present disclosure. The term "and/or" used herein includes any and all combinations of one or more of the associated listed items.

In order to make purposes, technical solutions and advantages of the present disclosure clearer and more understandable, the following is a further detailed description of the present disclosure with reference to the accompanying drawings and embodiments. It is to be understood that the specific embodiments described herein are intended to explain the present disclosure only and are not intended to limit the present disclosure.

Figure 1:
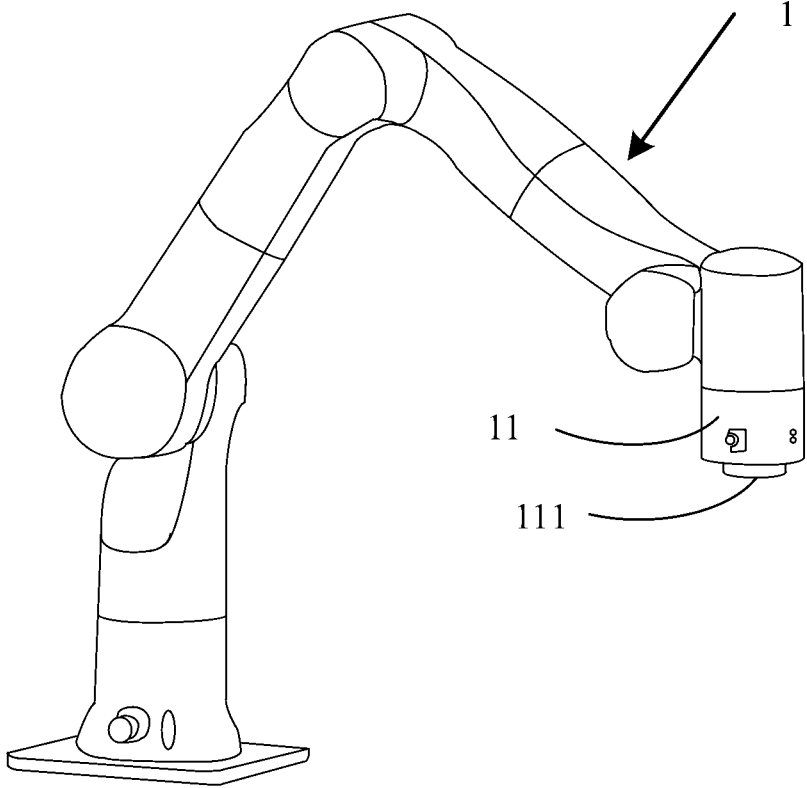
FIG. 1 is a schematic diagram illustrating a robot for which a method for aligning a robot end with a target object according to an embodiment is applied.

A method for aligning a robot end with a target object, and a robot and a computer readable storage medium for the same are provided according to an embodiment of the present disclosure. FIG. 1 is a schematic diagram illustrating the robot 1 for implementing the method for aligning the robot end with the target object according to an embodiment. The robot 1 may be a 7-degree-of-freedom redundant robot, which, in operation, can efficiently optimize a control configuration with the redundant degrees of freedom, thereby performing a position control and a force control efficiently during flexible contact. The robot 1 may also be, e.g., another redundant robot, a non-redundant robot or even an under-redundant robot. The robot 1 is provided with a torque sensor, such as, a joint sensor, a terminal six-dimensional sensor, or the like. The robot detects information about a contact force or a contact torque between an operating position of the robot and the environment in Cartesian by the torque sensor to implement the contact force control. In other embodiments, the robot 1 may not be provided with the torque sensor, what is essential is the robot 1 has a capability of compliant force contact control. The compliant force contact control may be implemented based on a direct force control strategy force/torque feedback, or may be implemented based om an indirect force control strategy with impedance control.

Figure 3:
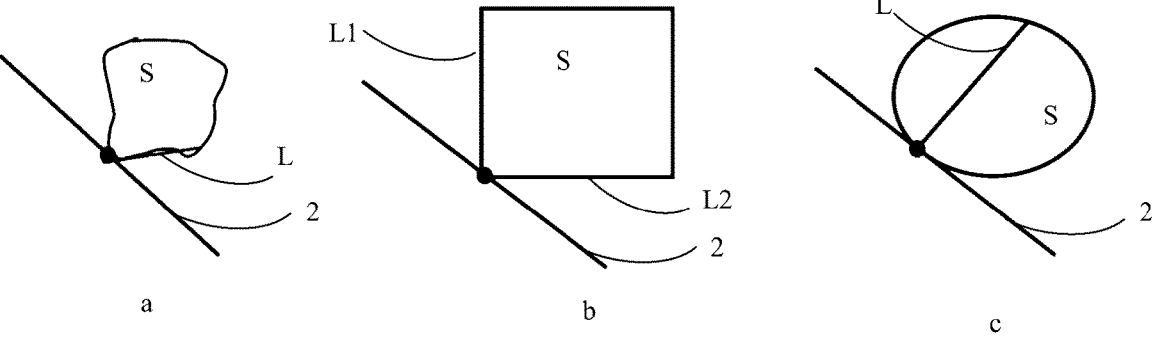
FIG. 3 is a schematic diagram illustrating states where the surfaces to be aligned of different shapes are in contact with the target object according to the method illustrated in FIG. 2.

Referring to FIG. 1, the robot 1 includes a body end 11. The body end 11 is generally provided with a specific tool, such as a vacuum head, a clamping jaw, or the like, to operate an object during flexible contact. It should be noted that the robot end can be considered as corresponding to the body end 11, the specific tool mounted on the body end 11, or a held object held by the specific tool or by the body end 11. Referring to FIGS. 3*a*, 3*b* and 3*c*, the target object 2 may be an object to be contacted or clamped, or may be the environment to be contacted. A surface S to be aligned is formed by an end face of the robot end configured to be in contact with the target object 2. The posture alignment of the robot end with the target object 2 includes alignment of the surface S to be aligned with the target object 2. In this embodiment, the surface S to be aligned includes an end face 111 of the body end 11 of the robot 1 configured to be aligned with the target object 2 and an end face of the held object held by the body end 11 configured to be aligned with the target object 2.

Referring to FIGS. 3*a*, 3*b* and 3*c*, the surface S to be aligned may be of any shape. The surface S to be aligned includes at least one line L to be aligned. The line L to be aligned is aligned with the target object 2 by rotating the line L to be aligned, and therefore the surface S to be aligned is aligned with the target object 2. The line L to be aligned is selected by a user. The line L to be aligned may be a line segment located at an edge of the surface S to be aligned, or a line segment connecting a contact point q and any point on the edge of the surface S to be aligned. When there is only one line L to be aligned, the line L to be aligned is at least partly or entirely located within the surface S to be aligned. The user, only by rotating the line L to be aligned to make it aligned with the target object 2, can achieve the posture alignment of the surface S to be aligned with the target object 2. In this embodiment, the surface S to be aligned, as shown in FIG. 3*b*, is a rectangle, and two adjacent sides of the rectangle are served as the lines L1 and L2 to be aligned. The line L1 to be aligned and the line L2 to be aligned are respectively aligned with the target object 2 in sequence, and therefore the alignment of the surface S to be aligned with the target object 2 is achieved.

FIG. 2 is a flow diagram illustrating the method for aligning the robot end with the target object according to an embodiment. In an embodiment, referring to FIG. 2, the method for aligning the robot end with the target object 2 is provided to adjust a posture of the robot end when the robot end is in contact with the target object 2. The method is illustrated below as an example applied to the robot in FIG. 1, which includes following steps.

In step S100, a target direction for the surface S to be aligned is acquired.

The target direction is a direction in which the surface S to be aligned of the robot end points to the target object. The target direction may be acquired by a sensor.

In step S200, a point having a known position with respect to the surface S to be aligned is selected as the control point p, and a coordinate system of the control point p having an x-axis, a y-axis and a z-axis, i.e., an oxyz coordinate system, is established.

Figure 4:
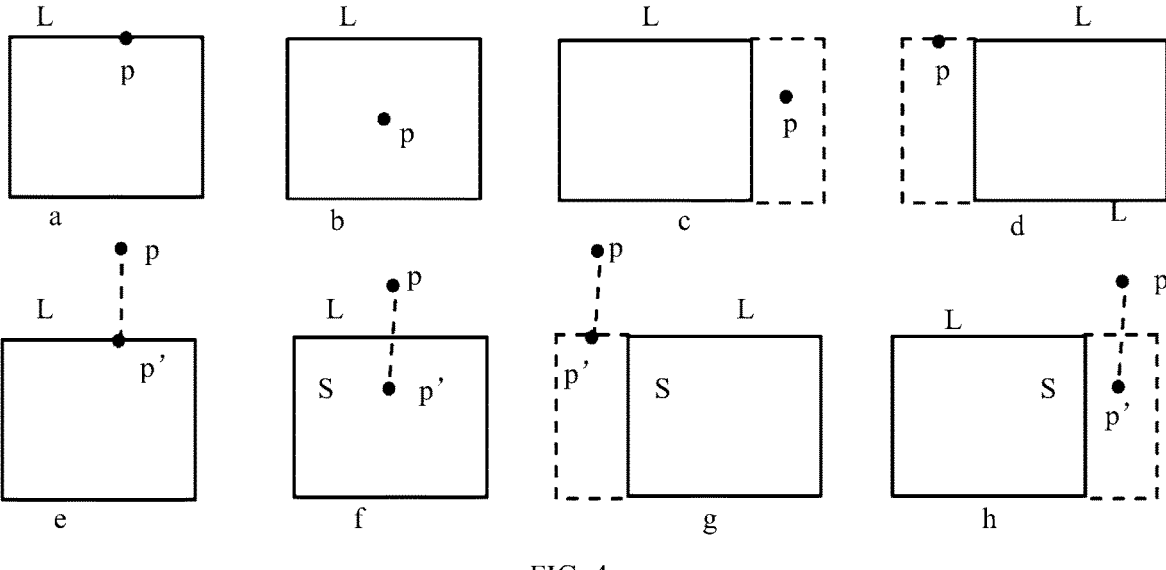
FIG. 4 is a schematic diagram illustrating relative position relationships between a selected control point and the surface to be aligned according to the method illustrated in FIG. 2.
Figure 5:
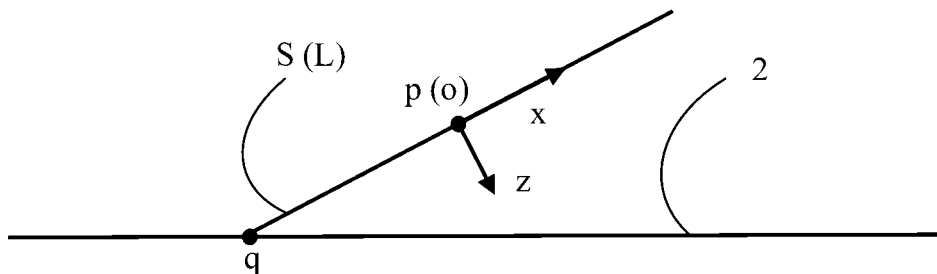
FIG. 5 is a schematic diagram illustrating a contact state where the surface to be aligned initially contacts the target object according to an embodiment.

In this step, the control point p may be any known point. For example, the control point p may be located on the surface S to be aligned (referring to FIGS. 4*a* to 4*b*), on an extension surface of the surface S to be aligned (referring to FIGS. 4*c* to 4*d*), or neither (referring to FIGS. 4*e* to 4*h*). Specifically, referring to FIGS. 4*a* and 4*b*, the control point p is located on the surface S to be aligned, and further, referring to FIG. 4*a*, the control point p is located on the line L to be aligned. Referring to FIGS. 4*c* and 4*d*, the control point p is located on the extension surface of the surface S to be aligned. Further, referring to FIG. 4*d*, the control point p is located on an extension line of the line L to be aligned. Referring to FIGS. 4*c* and 4*f*, a projective point p' of the control point p is located on the surface S to be aligned, and further, referring to FIG. 4*f*, the projective point p' of the control point p is located on the line L to be aligned. Referring to FIGS. 4*g* and 4*h*, the projective point p' of the control point p is located on the extension plane of the surface S to be aligned. Further, referring to FIG. 4*g*, the projective point p' of the control point p is located on the extension line of the line L to be aligned. In this embodiment, referring to FIG. 4*a*, the control point p is located on the surface S to be aligned, and further, the control point p is located on the line L to be aligned.

In the oxyz coordinate system, the control point p is served as an origin o of the coordinate system, the y-axis is along a normal direction of a principal plane, and a specific orientation of the y-axis can be determined by the right-hand rule. The surface S to be aligned is rotated by using the y-axis as the rotation axis. The z-axis and the x-axis may be at any angle to the surface S to be aligned, so long as the z-axis points to the target object 2. In this embodiment, the z-axis is perpendicular to the surface S to be aligned. During the rotation of the surface S to be aligned, an angle between the z-axis and the surface S to be aligned remains constant. That is to say, the vector coordinates of the z-axis in the base coordinate system varies with the rotation of the surface S to be aligned. It should be noted that, in the present disclosure, the z-axis is not limited to perpendicular to the surface S to be aligned only, but the z-axis may be substantially perpendicular to the surface S to be aligned, or may be at an angle, e.g., at an angle of 10 degrees to 35 degrees, to a normal to the surface S to be aligned. Therefore, as long as the oxyz coordinate system is established with reference to the method according to the present disclosure, it shall be considered to be within the scope of the present disclosure.

In step S300, the surface S to be aligned is controlled to move along a direction such that the z-axis of the coordinate system points in the target direction.

By performing the step S300, at least one point on the surface S to be aligned can be in contact with the target object, and one of the at least one point on the surface S to be aligned in contact with the target object is served as the contact point q. The contact point q and the control point p are different points, that is, the contact point q is not overlapped with the control point p.

In step S400, force information of the robot end is acquired, and when the surface S to be aligned is determined to be in contact with the target object 2 based on the force information, the surface S to be aligned is rotated with respect to the target object 2 actively and is kept in contact with the target object 2, and a first displacement dp1 of the control point p during this process is acquired.

The force information of the robot end can be acquired by a sensor, such as a torque sensor. When the robot end is in contact with the surface S to be aligned, the force applied on the robot end varies significantly. Therefore, it is possible to determine whether the robot end is in contact with the surface S to be aligned.

In step S500, a relationship between the first displacement dp1 of the control point p and the z-axis is determined.

In step S600, based on the relationship between the first displacement dp1 and the z-axis, whether the current rotation direction is a correct alignment direction is determined to obtain a first determination result.

In step S700, the surface S to be aligned is controlled, based on the first determination result, to be rotated to achieve alignment of the surface S to be aligned with the target object 2.

With the method, the surface S to be aligned is controlled to be rotated by the relationship between the first displacement dp1 of the control point p before and after the rotation and the z-axis, thereby achieving the posture alignment of the surface S to be aligned with the target object 2. The posture deviation between the surface S to be aligned and the target object 2 within a small range can be adjusted, with a high accuracy in controlling the posture alignment. Moreover, the method does not require a high-accuracy force/torque sensor, and has advantages of wide applicability and low cost.

In some embodiments, as shown in FIGS. 5 to 11, for the sake of description, the selected z-axis is perpendicular to the line L to be aligned. Specifically, the z-axis is perpendicular to the surface S to be aligned and points to the target object 2. The x-axis extends along the line L to be aligned. The y-axis is parallel to the normal of the paper surface and points outward. The force control is performed by using the z-axis as a force control direction, and the position control is performed in other directions. For example, a force-position mixing control is performed by using the z-axis as the force control direction, and the y-axis as the rotation direction of the posture alignment, so that the surface S to be aligned is kept in contact with the target object 2 during the rotation. It should be noted that, in this embodiment, there is no special requirement for a performance of the force control in the z-axis direction, so long as the robot end is kept in contact with the target object 2 during rotation.

Figure 8:
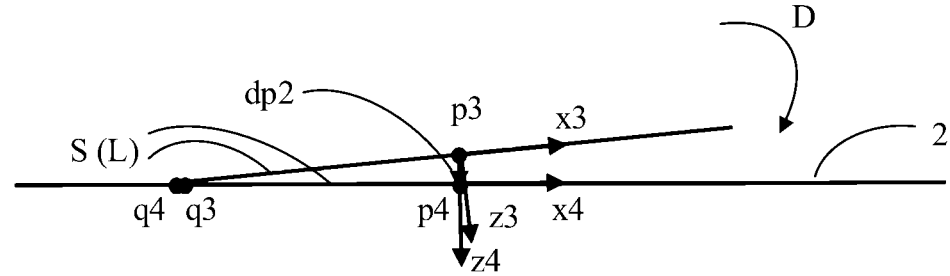
FIG. 8 is a schematic diagram illustrating a contact state where the surface to be aligned in FIG. 7 contacts the target object after being rotated by a further angle.
Figure 9:
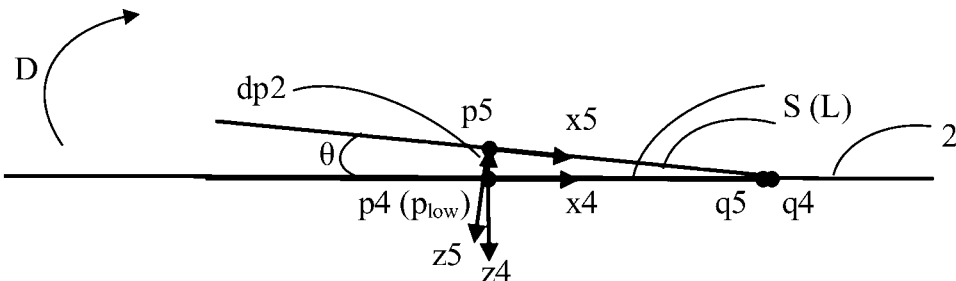
FIG. 9 is a schematic diagram illustrating a contact state where the surface to be aligned in FIG. 8 contacts the target object after being rotated by a further angle.
Figure 10:
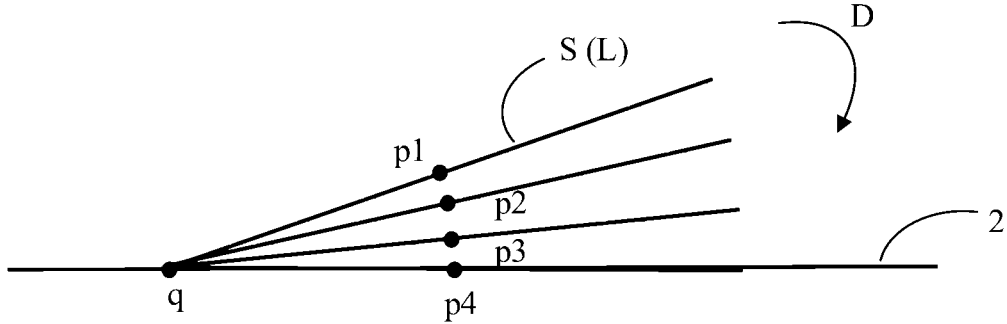
FIG. 10 is a schematic diagram illustrating a process of the posture alignment of the surface to be aligned with the target object according to another embodiment.

Further, in this embodiment, as shown in FIGS. 5 to 10, the control point p is located at a center point of the line L to be aligned. As shown in FIGS. 5 to 9, the control point p is simultaneously served as a force-position mixing control point (i.e., the line L to be aligned is rotated by using the control point p as a center of rotation) and an alignment direction determination point. Referring to FIG. 10, two different points may also be selected as the force-position mixing control point and the alignment direction determination point, respectively. For example, the contact point q is served as the force-position mixing control point, and the control point p is served as the alignment direction determination point. In this case, during the rotation of the surface S to be aligned, sliding of the contact point q on the target object 2 can be reduced, which helps to improve robustness of determining the alignment direction in the method. It should be noted that the control point p, in this case, cannot be located at two end points of the line L to be aligned, and the specific position of the contact point q on the robot needs to be explicitly known. However, for some application scenarios, such as an application scenario where the held object held by the robot is aligned with the target object 2, the contact point q cannot be determined because the position and orientation of the held object on the robot cannot be completely determined.

Figure 11:
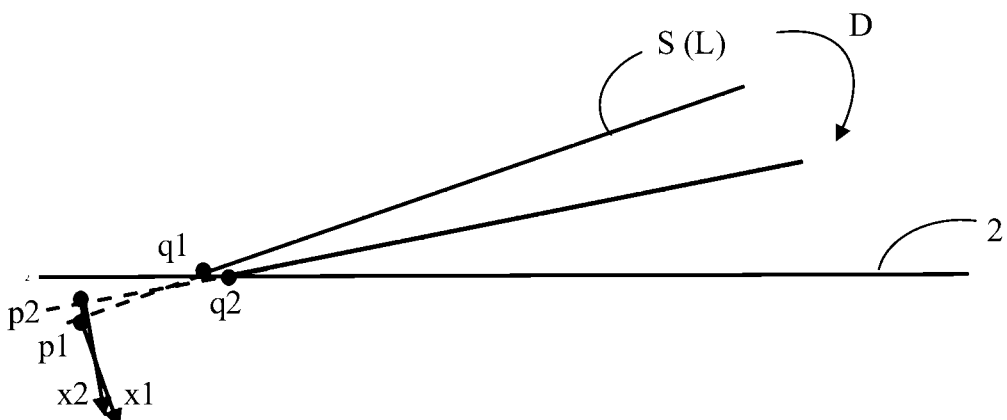
FIG. 11 is a schematic diagram illustrating a contact state where the surface to be aligned contacts the target object after being rotated by an angle according to yet another embodiment.

In another embodiment, as shown in FIG. 11, the control point p may also be located on a reverse extension line of the line L to be aligned. It should be noted that the control point p includes a point p1, a point p2, a point p3, a point p4, a point p5, and the like, and the contact point q includes a point q1, a point q2, a point q3, a point q4, a point q5, and the like.

In an embodiment, the step S500 specifically includes the following steps.

In step S510, a first vector projection of the first displacement dp1 of the control point p in the z-axis is calculated.

In step S520, the relationship between the first displacement dp1 of the control point p and the z-axis is determined based on the first vector projection.

If the first vector projection is positive, it is determined that the first displacement dp1 points in a same direction as the z-axis point.

If the first vector projection is negative, it is determined that the first displacement dp1 points in a direction opposite to the z-axis.

It should be noted that the first displacement dp1 points in the same direction as the z-axis means that the first displacement dp1 pointing in exactly the same direction as the z-axis, or the first displacement dp1 points in approximately the same direction as z-axis. That is to say, an angle between the dp1 and the z-axis is in a range of greater than or equal to 0 degree, and in a range of less than 90 degrees.

It should be noted that the first displacement dp1 pointing in the direction opposite to the z-axis means that the first displacement dp1 points in the direction exactly opposite to the z-axis, or the first displacement dp1 points in the direction approximately opposite to the z-axis. That is to say, an angle between the dp1 and the z-axis is in a range of greater than 90 degrees, and in a range of less than or equal to 180 degrees.

Specifically, the step S510 includes the following steps.

In step S511, the first displacement dp1 of the control point p before and after the rotation in the base coordinate system is calculated.

Figure 6:
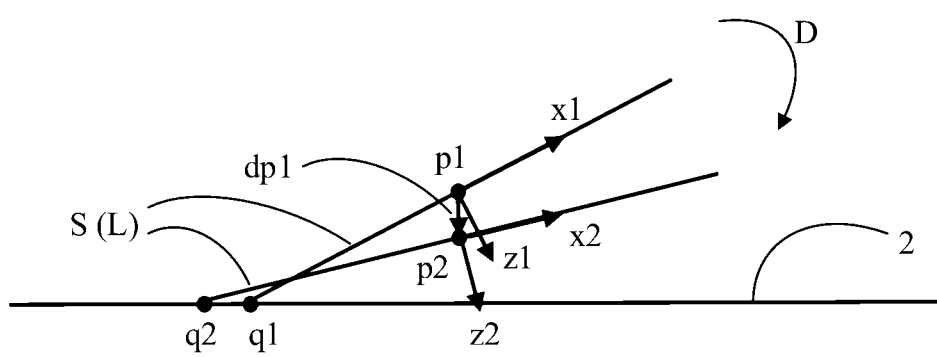
FIG. 6 is a schematic diagram illustrating a contact state where the surface to be aligned after being rotated by an angle according to an embodiment.

Specifically, as shown in FIG. 6, the control point p is located at the point p1 before the active rotation, the control point p is located at the point p2 after the rotation, and the contact point q is moved from the original point q1 to the point q2. Therefore, the first displacement dp1 is expressed as dp1=p2=p1, where p1 and p2 represent coordinates in the base coordinate system respectively.

In step S512, a vector expression of the z-axis in the base coordinate system is acquired.

Specifically, the vector expression of the z-axis is a vector expression z2 at a current time, i.e., a vector expression at a time when the control point p is rotated to the point p2. In other embodiments, the vector expression of the z-axis may be, e.g., a vector expression z1 at a time when the control point p is at the point p1, or an average of the vector expression z1 at the point p1 and the vector expression z2 at the point p2.

In step S513, the first displacement dp1 is dot-multiplied by the vector expression of the z-axis to obtain the first vector projection dot1 (dp1, z) of the first displacement dp1 in the z-axis.

In this embodiment, based on the control point p and z-axis in the base coordinate system, the first vector projection dot1 (dp1, z) of the first displacement dp1 of the control point on the z-axis can be easily obtained in real time by the dot produce of the control point p and the z-axis in the base coordinate system. Therefore, whether the direction of rotation of the surface S to be aligned is the correct alignment direction is determined based on the first vector projection dot1 (dp1, z).

In an embodiment, there may be also an error in the actually calculated first vector projection dot1 (dp1, z) due to errors between actual acquired values of the control point p and the z-axis and ideal values thereof. In particular, when a rotation angle of the surface S to be aligned is small (i.e., dp1 is small), a sign of the actually calculated first vector projection dot1(dp1, z) is even opposite to a sign of the ideal first vector projection dot1(dp1, z), thereby causing an error in determining the rotation direction. In order to improve the robustness of determining the rotation direction, a first threshold $T_1$ may be preset. The first threshold $T_1$ is related to a size of the surface S to be aligned and a position where the control point p is selected. When the position deviation |dp1| of the control point p before and after the rotation satisfies |dp1|<$T_1$, the sign of dot1 (dp1, z) is not determined. The surface S to be aligned is kept being rotated by a certain angle until the position deviation |dp1| of the control point p before and after the rotation is greater than or equal to the first threshold $T_1$, and then whether the current rotation direction is the correct alignment direction is determined.

In an embodiment, the step S600 where whether the current rotation direction is the correct alignment direction is determined based on the relationship between the first displacement dp1 and the z-axis to obtain the first determination result includes that: in response to the control point p being located on the surface S to be aligned: if the first displacement dp1 points in a same direction as the z-axis, the current rotation direction is determined as the correct alignment direction; and if the first displacement dp1 points in a direction opposite to the z-axis, the current rotation direction is determined as a wrong alignment direction.

As shown in FIGS. 5 to 10, the control point p is located at the center point of the line L to be aligned. When the line L to be aligned is rotated in a clockwise rotation direction D, dot1 (dp1, z)>0 is satisfied, and the first displacement dp1 points in the same direction as the z-axis. In this case, the clockwise rotation direction D is the correct alignment direction. When the line L to be aligned is rotated in a counterclockwise rotation direction (i.e., a reverse direction of D), dot1 (dp1, z)<0 is satisfied, and the first displacement dp1 points in the direction opposite to the z-axis. In this case, the counterclockwise rotation direction is the wrong alignment direction. Similarly, the determination condition above is applicable to some cases in which the control point p is located beyond the line L to be aligned. For example, the control point p is located on the forward extension line of the line L to be aligned, i.e., the control point p is located beyond the endpoints of the line L to be aligned and located in the forward extension direction of the x-axis, or the projective point p' of the control point p to the line L to be aligned is located on the line L to be aligned or on the forward extension line of the line L to be aligned.

In other embodiments, as shown in FIG. 11, the control point p is located on the reverse extension line of the line L to be aligned. When the line L to be aligned is rotated in the clockwise rotation direction D, dot1 (dp1, z)<0 is satisfied, and the first displacement dp1 points in the direction opposite to the z-axis. In this case, the clockwise rotation direction D is the correct alignment direction. When the line L to be aligned is rotated in the counterclockwise rotation direction, dot1 (dp1, z)>0 is satisfied, and the first displacement dp1 points in the same direction as the z-axis. In this case, the counterclockwise rotation direction is the wrong alignment direction. In an embodiment, the step S700 specifically includes the following steps.

In step S710, if the current rotation direction is the correct alignment direction, the surface S to be aligned is rotated in the current rotation direction.

In step S720, if the current rotation direction is the wrong alignment direction, the surface S to be aligned is rotated in the reverse direction of the current rotation direction.

In this embodiment, as shown in FIG. 6, the current rotation direction is the clockwise rotation direction D, the control point p is rotated from the point p1 to the point p2, and the contact point q is correspondingly moved from the point q1 to the point q2. In this case, dot1 (dp1, z)>0 is satisfied, and therefore the clockwise rotation direction D is the correct alignment direction. The surface S to be aligned is kept being rotated in the clockwise rotation direction D to be aligned with the target object 2. In other embodiments, if the current rotation direction is the counterclockwise rotation direction, dot1 (dp, z)<0 is satisfied, and the counterclockwise rotation direction is the wrong alignment direction. Therefore, the surface S to be aligned is kept being rotated in the clockwise rotation direction D to be aligned with the target object 2.

In an embodiment, after the step S700 where the surface S to be aligned is controlled, based on the first determination result, to be rotated to achieve alignment of the surface S to be aligned with the target object 2 further includes the following steps.

In step S800, a second displacement dp2 of the control point p is acquired during the surface S to be aligned being rotated based on the first determination result.

In step S900, a relationship between the second displacement dp2 of the control point p and the z-axis is determined.

In step S1000, whether the current rotation direction is the correct alignment direction is determined, based on the relationship second displacement dp2 of the control point p and the z-axis, to obtain a second determination result.

In step S1100, when the second determination result indicates that the current rotation direction is the wrong alignment direction, whether the surface to be aligned is aligned with the target object is determined to obtain a third determination result.

In step S1200, the surface to be aligned is controlled to be rotated based on the third determination result.

In the method provided according to this embodiment, whether the current rotation direction is the correct alignment direction can be determined in real time during the rotation of the surface S to be aligned, and then the surface S to be aligned can be automatically and accurately rotated to be aligned with the target object 2 by controlling surface S to be aligned to be rotated based on the determination results.

Further, the step S900 specifically includes the following steps.

In step S910, a second vector projection of the second displacement dp2 of the control point p in the z-axis is calculated.

In step S920, the relationship between the second displacement dp2 of the control point p and the z-axis is determined based on the second vector projection.

If the second vector projection is positive, it is determined that the second displacement dp2 points in the same direction as the z-axis.

If the second vector projection is negative, it is determined that the second displacement dp2 points in a direction opposite to the z-axis.

It should be noted that the second displacement dp2 pointing in the same direction as the z-axis means that the second displacement dp2 pointing in exactly the same direction as the z-axis, or the first displacement dp2 points in approximately the same direction as the z-axis. That is to say, an angle between the dp2 and the z-axis is in a range of greater than or equal to 0 degree, and in a range of less than 90 degrees.

It should be noted that the second displacement dp2 pointing in the direction opposite to the z-axis means that: the first displacement dp2 points in the direction exactly opposite to the z-axis, or the second displacement dp2 points in the direction approximately opposite to the z-axis. That is to say, an angle between the dp2 and the z-axis is in a range of greater than 90 degrees, and in a range of less than or equal to 180 degrees.

Specifically, step S910 includes the following steps.

In step S911, the second displacement dp2 of the control point p before and after the rotation in the base coordinate system is calculated.

In step S912, a vector expression of the z-axis in the base coordinate system is acquired.

In step S913, the second displacement dp2 is dot-multiplied by the vector expression of the z-axis to obtain the first vector projection dot2 (dp2, z) of the second displacement dp2 in the z-axis.

In step S911, if the position deviation |dp2| of the control point p is less than the first threshold $T_1$, the surface S to be aligned is kept being rotated until the position deviation of the control point p is greater than or equal to the first threshold $T_1$, and then the step S913 where the second vector projection dot2 (dp2, z) being calculated to obtain the second determination result is performed.

In this embodiment, as shown in FIGS. 5 to 10, the control point p is located at a center point of the line L to be aligned. The step S1000 where whether the current rotation direction is the correct alignment direction is determined, based on the relationship second displacement dp2 of the control point p and the z-axis, to obtain a second determination result includes that: when the line L to be aligned is rotated clockwise, dot2 (dp2, z)>0 is satisfied, the second displacement dp2 points in the same direction as the z-axis, and therefore the clockwise rotation direction is the correct alignment direction; and when the line L to be aligned is rotated counterclockwise, dot2 (dp2, z)<0 is satisfied, the second displacement dp2 points in the direction opposite to the z-axis, and therefore the counterclockwise rotation direction is the wrong alignment direction. In other embodiments, as shown in FIG. 11, the control point p is located on the reverse extension line of the line L to be aligned. The step S1000 where whether the current rotation direction is the correct alignment direction is determined, based on the relationship second displacement dp2 of the control point p and the z-axis, to obtain a second determination result includes that: when the line L to be aligned is rotated clockwise, that dot2 (dp2, z)<0 is satisfied, the second displacement dp2 points in the direction opposite to the z-axis, and therefore the clockwise rotation direction is the correct alignment direction; and when the line L to be aligned is rotated counterclockwise, dot2 (dp2, z)>0 is satisfied, the second displacement dp2 points in the same direction as the z-axis, and therefore the counterclockwise rotation direction is the wrong alignment direction.

Figure 7:
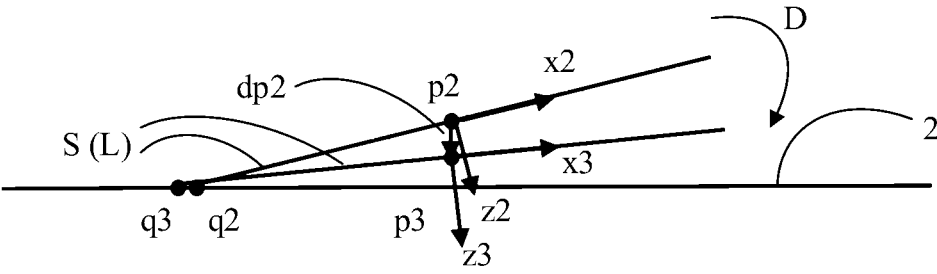
FIG. 7 is a schematic diagram illustrating a contact state where the surface to be aligned in FIG. 6 contacts the target object after being rotated by a further angle.

Specifically, in this embodiment, as shown in FIG. 7, the surface S to be aligned is rotated in the clockwise rotation direction D, the control point p is rotated from the point p2 to the point p3, the contact point q is correspondingly moved from the point q2 to the point q3, and therefore the second displacement dp2 of the control point p is expressed as dp2=p3−p2. And the vector expression of the z-axis is a vector expression z3 at the current time, i.e., the vector expression z3 at a time when the control point p is rotated to the point p3. In other embodiments, the vector expression of the z-axis may be the vector expression z2 at a time when the control point p is at the point p2, or an average of the vector expression z2 at the point p2 and the vector expression z3 at the point z3, which is not limited herein. A second vector projection of dp2 in the z-axis is calculated, and satisfies dot2 (dp2, z3)>0, and therefore the clockwise rotation direction D is the correct alignment direction.

In this embodiment, as shown in FIG. 8, the surface S to be aligned is kept being rotated in the clockwise rotation direction D until the control point p is rotated from the point p3 to the point p4. The surface S to be aligned is completely in contact with the target object 2, and the contact point q is correspondingly moved from the point q3 to the point q4. The second displacement dp2 of the control point p is expressed as dp2=p4−p3, and the z-axis vector expression is a vector expression z4 when the control point p is rotated to the point p4. The second vector projection of dp2 in the z-axis satisfies dot2 (dp2, 24)>0, and therefore the clockwise rotation direction D is still the correct alignment direction. Since the robot cannot determine, based on a sign of the second vector projection, whether the surface S to be aligned is aligned with the target object 2 when the control point p is at the point p4, the surface S to be aligned will be kept being rotated in the clockwise rotation direction D under the force control of the robot.

In this embodiment, as shown in FIG. 9, when the control point p is rotated from the point p4 to the point p5, the second displacement dp2 of the control point p is expressed as dp2=p5−p4, the contact point q is correspondingly moved from the point q4 to the point q5, and the vector expression of the z-axis is the vector expression z5 when the control point p is rotated to p5. A second vector projection of dp2 in the z-axis satisfies dot2 (dp2, z5)<0, and therefore the clockwise rotation direction D is the wrong alignment direction. At this time, whether the surface to be aligned reaches the posture alignment with the target object is determined to obtain a third determination result. And the surface S to be aligned is controlled, based on the first determination result, to be rotated to achieve the posture alignment with the target object 2.

In the method provided according to this embodiment, whether the current rotation direction is the correct alignment direction can be determined during the rotation of the surface S to be aligned. When the current rotation direction turns to be the wrong alignment direction, a third determination result is obtained by determining whether the surface S to be aligned is aligned with the target object 2, and the surface S to be aligned is controlled, based on the third determination result, to be rotated to achieve the alignment with the target object 2.

In an embodiment, the step S1100 where whether the surface to be aligned is aligned with the target object is determined, when the second determination result indicates that the current rotation direction is the wrong alignment direction, to obtain a third determination result further includes the following steps.

In step S1110, a distance threshold $T_0$ for the position deviation of the control point p is preset. The distance threshold $T_0$ is related to the size of the surface S to be aligned and the position where the control point p is selected. In practice, the distance threshold $T_0$ may be determined by debugging or by a formula conversion.

For example, as shown in FIG. 9, the line L to be aligned of the surface S to be aligned has a length of l, the control point p is located at the center point of the line L to be aligned, and the contact point q is located at an end point of the line L to be aligned. There is an angle θ between the control point p at any point and the control point p at a lowest point $p_{low}$ (i.e., the point where the line L to be aligned/the surface S to be aligned is completely in contact with and aligned with the target object 2). When the angle θ is less than or equal to an angle threshold $θ_0$, the line L to be aligned/the surface S to be aligned can be considered be aligned with the target object 2. At this time, the distance threshold satisfies $T_0=\frac{1}{2}*\sin θ_0$, and therefore a correlation between the distance threshold $T_0$ and the angle threshold $θ_0$ is established. As long as the threshold $θ_0$ is within a certain range, a deviation during the posture alignment can be controlled within a certain range regardless of the variation of the size of the surface S to be aligned and the control point p. In this embodiment, the first threshold $T_1$ may be equal to the distance threshold $T_0$, i.e., $T_1=T_0$.

In step S1120, a lowest point $p_{low}$ of the control point p having a lowest projection in the z-axis is acquired during the rotation.

In step S1130, current coordinates of the control point p are compared with the lowest point $p_{low}$, and when the position deviation between the control point p and the lowest point plow is less than or equal to the distance threshold $T_0$, the surface S to be aligned is aligned with the target object 2. The position deviation between the control point p and the lowest point $p_{low}$ refers to the distance between the coordinates of the control point p at the current time and coordinates of the lowest point $p_{low}$ of the control point p at the lowest point.

In step S1120, when the surface S to be aligned is aligned with the target object 2, the control point p is at the lowest point $p_{low}$. However, during the continuous rotation, the robot cannot determine whether the surface S to be aligned at the current time is aligned with the target object 2 directly, and cannot directly acquire the lowest point $p_{low}$ at the time when posture alignment is achieved. Therefore, the lowest point $p_{low}$ needs to be acquired indirectly by comparison, calculation, or the like.

In some embodiments, as shown in FIGS. 6 to 9, during the continuous rotation of the surface S to be aligned, a plurality of coordinates (e.g., p2, p2, p3, p4, and p5) of the control point p at arbitrary times during rotation of the control point p from p2 to p5 and z-axis vector expressions (e.g., z1, z2, z3, z4, and z5) corresponding to the times are acquired. A third vector projection dot3 (p, z) of the coordinates of the control point p in the z-axis is calculated. A corresponding point with a minimum absolute value of the third vector projection, which is the lowest point plow, is obtained by comparing absolute values |dot3 (p, z)| of the third vector projections of the control point p at different positions with each other. The lowest point $p_{low}$ acquired in this manner has a high accuracy and a small deviation from the theoretical lowest point $p_{low}$ corresponding to a case in which the surface S to be aligned/the line L to be aligned is completely in contact with the target object 2.

In other embodiments, the lowest point $p_{low}$ may be determined by the sign of the second vector projection dot2

(dp2, z). When the control point p is rotated from the point p4 to the point p5, dot2 (dp2, z)<0 is satisfied for the first time, and the surface S to be aligned has been aligned with the target object 2 before the control point p is rotated to the point p5. Therefore, the point p4 is determined as the lowest point plow. In this method, by directly using the stored control point coordinates and the sign of the calculated second vector projection dot2 (dp2, z), the lowest point $p_{low}$ can be obtained very conveniently without additional calculation.

In other embodiments, it can be determined by the sign of the second vector projection dot2 (dp2, z) that the lowest point $p_{low}$ appears during the control point p being rotated from the point p4 to the point p5. The coordinates of the control point p at arbitrary time during the rotation from the point p4 to the point p5 and the z-axis vector expressions corresponding to the time are acquired, and the third vector projection dot3 (p, z) of the coordinates of the control point p in the z-axis is calculated. The lowest point $p_{low}$ is the point corresponding to the minimum absolute value of the third vector projection obtained by comparing the absolute values |dot3 (p, z)| of the third vector projections of the control point p at different positions. In this method, at first, the lowest point $p_{low}$ is determined in a range by using the sign of the calculated second vector projections dot2 (dp2, z), which can reduce calculations. And then, the absolute values of the third vector projections of the control point p in the z-axis where the control point p is at the different positions are compared with each other to obtain the lowest point plow. The lowest point $p_{low}$ obtained in this manner has the high accuracy and the small deviation from the theoretical lowest point $p_{low}$ corresponding to the case in which the surface S to be aligned/the line L to be aligned is completely in contact with the target object 2. That is to say, the lowest point $p_{low}$ can be obtained conveniently and accurately.

In an embodiment, the step S1130 specifically includes that: if the alignment is not achieved, the surface S to be aligned is rotated reversely until the surface S to be aligned is aligned with the target object 2, so that the convergence accuracy of the alignment of the surface S to be aligned with the target object 2 is improved; and if the alignment has been achieved, the surface S to be aligned is stopped being rotated. In this embodiment, as shown in FIG. 9, when the control point p is at the point p5, whether the alignment is achieved is determined by comparing the position deviation of the point p5 from the lowest point $p_{low}$ with $T_0$. If the position deviation of the point p5 from the lowest point $p_{low}$ is greater than $T_0$, it indicates that the alignment is not achieved when the control point p is at the p5 point. At this time, the surface S to be aligned is reversely rotated and the current coordinates of the control point p is compared with the lowest point $p_{low}$ during the reverse rotation until the control point p is reversely rotated to a position where the position deviation from the lowest point $p_{low}$ is less than or equal to the distance threshold $T_0$, which indicates that the line L to be aligned is aligned with the target object 2. And then, the surface S to be aligned is stopped being rotated.

In the method provided according to this embodiment, the surface S to be aligned is controlled by calculating the position deviation between the current coordinates of the control point p and the lowest point plow to be rotated until the position deviation is less than or equal to the distance threshold $T_0$, which can be considered that the surface S to be aligned is aligned with the target object 2. With this method, the posture alignment of the surface S to be aligned with the target object 2 can be achieved automatically and accurately.

It should be understood that although the steps in the flow diagram of FIG. 2 are shown sequentially as indicated by arrows, these steps are not necessarily executed sequentially as indicated by arrows. Unless explicitly stated herein, these steps are not executed in a strict order and may be executed in other orders. Moreover, at least a part of the steps in FIG. 2 may include a plurality of steps or stages, the steps or the stages are not necessarily executed at the same time, but may be executed at different times, and the execution order of the steps or the stages is not necessarily executed sequentially, but may be executed alternately with other steps or at least a part of the steps or stages in other steps.

In an embodiment, a robot 1 is provided. The robot includes a memory and a processor. The memory stores a computer program for aligning a robot end with a target object. The computer program, when executed by the processor, causes the processor to implement the following operations: acquiring a target direction for the surface to be aligned; selecting a point having a known position with respect to the surface to be aligned as the control point p, and establishing a coordinate system of the control point p having an x-axis, a y-axis and a z-axis; controlling the surface to be aligned to move along a direction such that the z-axis of the coordinate system points in the target direction; acquiring force information of the robot end, and determining whether the surface to be aligned is in contact with the target object; rotating, when the surface S to be aligned is determined to be in contact with the target object based on the force information, the surface S to be aligned with respect to the target object 2 actively and keep the surface S to be aligned in contact with the target object 2, and acquiring a first displacement dp1 of the control point p during this process; determining a relationship between the first displacement dp1 of the control point p and the z-axis; determining, based on the relationship between the first displacement dp1 and the z-axis, whether the current rotation direction is a correct alignment direction to obtain a first determination result; and controlling, based on the first determination result, the surface to be aligned to be rotated.

In an embodiment, the computer program, when executed by the processor, causes the processor to further implement the following operations: acquiring a second displacement dp2 of the control point p during the surface to be aligned being rotated based on the first determination result; determining a relationship between the second displacement dp2 of the control point p and the z-axis; determining, based on the relationship second displacement dp2 of the control point p and the z-axis, whether the current rotation direction is the correct alignment direction to obtain a second determination result; determining, when the second determination result indicates that the current rotation direction is the wrong alignment direction, whether the surface to be aligned is aligned with the target object to obtain a third determination result; and controlling, based on the third determination result, the surface to be aligned to be rotated.

In an embodiment, the computer program, when executed by the processor, causes the processor to further implement the following operations: rotating, if the alignment is not achieved, the surface S to be aligned reversely until the surface S to be aligned is aligned with the target object; and stopping rotating, if the alignment has been achieved, the surface to be aligned.

In an embodiment, the computer program, when executed by the processor, causes the processor to further implement the following operations:

The determining the relationship between the first displacement dp1 of the control point p and the z-axis includes:

calculating a first vector projection of the first displacement dp1 of the control point p in the z-axis; and determining, based on the first vector projection, the relationship between the first displacement dp1 of the control point p and the z-axis.

If the first vector projection is positive, it is determined that the first displacement dp1 points in a same direction as the z-axis. If the first vector projection is negative, it is determined that the first displacement dp1 points in a direction opposite to the z-axis.

In an embodiment, the computer program, when executed by the processor, causes the processor to further perform the following operations: calculating a second vector projection of the second displacement dp2 of the control point p in the z-axis; and determining, based on the second vector projection, the relationship between the second displacement dp2 of the control point p and the z-axis.

If the second vector projection is positive, it is determined that the second displacement dp2 and the z-axis point in the same direction. If the second vector projection is negative, it is determined that the second displacement dp2 points in a direction opposite to the z-axis.

In an embodiment, the computer program, when executed by the processor, causes the processor to further implement the following operations: calculating the first displacement dp1 of the control point p before and after the rotation in the base coordinate system; acquiring a vector expression of the z-axis in the base coordinate system; and acquiring a dot product of the first displacement dp1 and the vector expression of the z-axis to obtain the first vector projection of the first displacement dp1 in the z-axis.

In an embodiment, the computer program, when executed by the processor, causes the processor to further implement the following operations: calculating the second displacement dp2 of the control point p before and after the rotation in the base coordinate system; acquiring the vector expression of the z-axis in the base coordinate system; and acquiring a dot product of the second displacement dp2 and the vector expression of the z-axis to obtain the second vector projection of the second displacement dp2 in the z-axis.

In an embodiment, the computer program, when executed by the processor, causes the processor to further implement the following operations: in response to the control point p being located on the surface S to be aligned: determining, if the first displacement dp1 points in a same direction as the z-axis, the current rotation direction as the correct alignment direction; and determining, if the first displacement dp1 points in a direction opposite to the z-axis, the current rotation direction as a wrong alignment direction.

In an embodiment, the computer program, when executed by the processor, causes the processor to further implement the following operations: in response to the control point p being located on the surface S to be aligned: determining, if the second displacement dp2 points in a same direction as the z-axis, the current rotation direction as the correct alignment direction; and determining, if the second displacement dp2 points in a direction opposite to the z-axis, the current rotation direction as the wrong alignment direction.

In an embodiment, the computer program, when executed by the processor, causes the processor to further implement the following operations: presetting a distance threshold $T_0$ related to the size of the surface to be aligned and the position where the control point p is selected; acquiring, during the rotation, a lowest point plow of the control point p having a lowest projection in the z-axis; and comparing current coordinates of the control point p with the lowest point plow, and when the position deviation between the control point p and the lowest point plow is less than or equal to the distance threshold $T_0$, the surface to be aligned is aligned with the target object.

In an embodiment, the computer program, when executed by the processor, causes the processor to further implement the following operation: presetting a first threshold $T_1$ related to the size of the surface to be aligned and the position where the control point p is selected; acquiring force information of the robot end, and determining whether the surface S to be aligned is in contact with the target object; and rotating the surface S to be aligned with respect to the target object 2 actively and keeping the surface S to be aligned in contact with the target object 2 when the surface S to be aligned is determined to be in contact with the target object based on the force information; and acquiring, when the position deviation of the control point p before and after the rotation is greater than or equal to the first threshold $T_1$, the first displacement dp1.

In an embodiment, the computer program, when executed by the processor, causes the processor to further implement the following operations: presetting the first threshold $T_1$ related to the size of the surface to be aligned and the position where the control point p is selected; and acquiring, when the position deviation of the control point p before and after the rotation is greater than or equal to the first threshold $T_1$, the second displacement dp2 during the rotation.

In an embodiment, a non-transitory computer readable storage medium on which a computer program for a method for aligning a robot end with a target object is stored. The computer program, when executed by a processor, causes the processor to implement the following operations: acquiring a target direction for the surface to be aligned; selecting a point having a known position with respect to the surface to be aligned as the control point p, and establishing a coordinate system of the control point p having an x-axis, a y-axis and a z-axis; controlling the surface to be aligned to move along a direction such that the z-axis of the coordinate system points in the target direction; acquiring force information of the robot end, and determining whether the surface S to be aligned is in contact with the target object; rotating, when the surface S to be aligned is determined to be in contact with the target object based on the force information, the surface S to be aligned with respect to the target object 2 actively and keeping the surface S to be aligned in contact with the target object 2, and acquiring a first displacement dp1 of the control point p during this process; determining a relationship between the first displacement dp1 of the control point p and the z-axis; determining, based on the relationship between the first displacement dp1 and the z-axis, whether the current rotation direction is a correct alignment direction to obtain a first determination result; and controlling, based on the first determination result, the surface to be aligned to be rotated.

In an embodiment, the computer program, when executed by a processor, causes the processor to implement the following operations: acquiring, during the surface to be aligned being rotated based on the first determination result, a second displacement dp2 of the control point p; determining a relationship between the second displacement dp2 of the control point p and the z-axis; and determining, based on the relationship second displacement dp2 of the control point p and the z-axis, whether the current rotation direction is the correct alignment direction to obtain a second determination result; determining, when the second determination result indicates that the current rotation direction is the wrong alignment direction, whether the surface to be aligned is aligned with the target object to obtain a third determination result; and controlling, based on the third determination result, the surface to be aligned.

In an embodiment, the computer program, when executed by a processor, causes the processor to implement the following operations: rotating, if the alignment is not achieved, the surface S to be aligned reversely until the surface S to be aligned is aligned with the target object; and stopping rotating, if the alignment is achieved, the surface to be aligned.

In an embodiment, the computer program, when executed by a processor, causes the processor to implement the following operations.

The determining the relationship between the first displacement dp1 of the control point p and the z-axis includes: calculating a first vector projection of the first displacement dp1 of the control point p in the z-axis; and determining, based on the first vector projection, the relationship between the first displacement dp1 of the control point p and the z-axis.

If the first vector projection is positive, it is determined that the first displacement dp1 point in a same direction as the z-axis. If the first vector projection is negative, it is determined that the first displacement dp1 points in a direction opposite to the z-axis point.

In an embodiment, the computer program, when executed by a processor, causes the processor to implement the following operations: calculating a second vector projection of the second displacement dp2 of the control point p in the z-axis; and determining, based on the second vector projection, the relationship between the second displacement dp2 of the control point p and the z-axis.

If the second vector projection is positive, it is determined that the second displacement dp2 points in a same direction as the z-axis point. If the second vector projection is negative, it is determined that the second displacement dp2 points in a direction opposite to the z-axis.

In an embodiment, the computer program, when executed by a processor, causes the processor to implement the following operations: calculating the first displacement dp1 of the control point p before and after the rotation in the base coordinate system; acquiring the vector expression of the z-axis in the base coordinate system; and acquiring a dot product of the first displacement dp1 and the vector expression of the z-axis to obtain the first vector projection of the first displacement dp1 in the z-axis.

In an embodiment, the computer program, when executed by a processor, causes the processor to implement the following operations: calculating the second displacement dp2 of the control point p before and after the rotation in the base coordinate system; acquiring the vector expression of the z-axis in the base coordinate system; and acquiring a dot product of the second displacement dp2 and the vector expression of the z-axis to obtain the second vector projection of the second displacement dp2 in the z-axis.

In an embodiment, the computer program, when executed by a processor, causes the processor to implement the following operations: in response to the control point p being located on the surface S to be aligned: determining, if the first displacement dp1 and the z-axis point in the same direction, the current rotation direction as the correct alignment direction; and determining, if the first displacement dp1 and the z-axis point in the opposite directions, the current rotation direction as a wrong alignment direction.

In an embodiment, the computer program, when executed by a processor, causes the processor to implement the following operations: in response to the control point p being located on the surface S to be aligned: determining, if the second displacement dp2 and the z-axis point in the same direction, the current rotation direction as the correct alignment direction; and determining, if the second displacement dp2 and the z-axis point in the opposite directions, the current rotation direction as the wrong alignment direction.

In an embodiment, the computer program, when executed by a processor, causes the processor to implement the following operations: presetting a distance threshold $T_0$ related to the size of the surface to be aligned and the position where the control point p is selected; acquiring, during the rotation, a lowest point $p_{low}$ of the control point p having a lowest projection in the z-axis; and comparing the current coordinates of the control point p are compared with the lowest point plow. When the position deviation between the control point p and the lowest point plow is less than or equal to the distance threshold $T_0$, the surface to be aligned is aligned with the target object.

In an embodiment, the computer program, when executed by a processor, causes the processor to implement the following operations: presetting a first threshold $T_1$ related to the size of the surface to be aligned and the position where the control point p is selected; acquiring force information of the robot end, and determining whether the surface S to be aligned is in contact with the target object; rotating, when the surface S to be aligned is determined to be in contact with the target object based on the force information, the surface S to be aligned with respect to the target object 2 actively and keeping the surface S to be aligned in contact with the target object 2; and acquiring, when a position deviation of the control point p before and after the rotation is greater than or equal to the first threshold $T_1$, the first displacement dp1 during the rotation.

In an embodiment, the computer program, when executed by a processor, causes the processor to implement the following operations; presetting a first threshold $T_1$ related to the size of the surface to be aligned and the position where the control point p is selected; and acquiring, when the position deviation of the control point p before and after the rotation is greater than or equal to the first threshold $T_1$, the second displacement dp2 during the rotation.

Those of ordinary skill in the art may understand that all or part of the processes in the method of the above embodiments may be completed by instructing relevant hardware by the computer program, and the computer program may be stored in a non-transitory computer readable storage medium. When the computer program is executed, the processes of the above methods in the embodiments may be included. Any reference to the memory, the storage, the database or other medium used in various embodiments provided in the present disclosure may include a non-transitory memory and/or a transitory memory. The non-transitory memory may include a read only memory (ROM), a programmable ROM (PROM), an electrically programmable ROM (EPROM), an electrically erasable programmable ROM (EEPROM) or a flash memory. The transitory memory may include a random access memory (RAM) or an external cache memory. As illustration rather than limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), a Rambus dynamic RAM (RDRAM), and the like.

The technical features of the above embodiments can be combined arbitrarily. To simplify the description, not all possible combinations of the technical features in the above embodiments are described. However, all of the combinations of these technical features should be considered as within the scope of this disclosure, as long as such combinations do not contradict with each other.

The above describe embodiments merely represent several embodiments of the present disclosure, and the description thereof is more specific and detailed, but it should not be construed as limiting the scope of the present disclosure.

The above described embodiments express only several implementations of the present disclosure, and the descriptions are more specific and detailed, but they should not be interpreted as a limitation of the scope of the present disclosure. It should be noted that, several modifications and improvements may be made for those of ordinary skill in the art without departing from the concept of the present disclosure, and these are all within the protection scope of the present disclosure. Therefore, the protection scope of the present disclosure shall be subject to the appended claims.

What is claimed is:

1. A method for aligning a robot end with a target object, the method being used to adjust a posture of the robot end when the robot end is in contact with the target object, and the method comprising:

acquiring a target direction for a surface to be aligned of the robot end;

selecting a point having a known position with respect to the surface to be aligned as a control point, and establishing a coordinate system of the control point having an x-axis, a y-axis and a z-axis;

controlling the surface to be aligned to move along a direction such that the z-axis of the coordinate system points in the target direction;

acquiring force information of the robot end, and determining whether the surface to be aligned is in contact with the target object;

rotating, when the surface to be aligned is determined to be in contact with the target object based on the force information, the surface to be aligned with respect to the target object actively and keeping the surface to be aligned in contact with the target object, and acquiring a first displacement of the control point during this process;

determining a relationship between the first displacement of the control point and the z-axis;

determining, based on the relationship between the first displacement and the z-axis, whether a current rotation direction is a correct alignment direction to obtain a first determination result; and controlling, based on the first determination result, the surface to be aligned to be rotated.

2. The method of claim 1, wherein, after the controlling, based on the first determination result, the surface to be aligned to be rotated, the method further comprises:

acquiring, during the surface to be aligned being rotated based on the first determination result, a second displacement of the control point;

determining a relationship between the second displacement of the control point and the z-axis;

determining, based on the relationship between the second displacement of the control point and the z-axis, whether the current rotation direction is the correct alignment direction to obtain a second determination result;

determining, when the second determination result indicates that the current rotation direction is a wrong alignment direction, whether the surface to be aligned is aligned with the target object to obtain a third determination result; and controlling, based on the third determination result, the surface to be aligned to be rotated.

3. The method of claim 2, wherein the controlling, based on the first determination result, the surface to be aligned to be rotated, comprises:

rotating, if the alignment is not achieved, the surface to be aligned reversely until the surface to be aligned is aligned with the target object; and stopping rotating, if the alignment is achieved, the surface to be aligned.

4. The method of claim 2, wherein the determining the relationship between the first displacement of the control point and the z-axis comprises:

calculating a first vector projection of the first displacement of the control point on the z-axis; and determining, based on the first vector projection, the relationship between the first displacement of the control point and the z-axis, wherein:

if the first vector projection is positive, it is determined that the first displacement points in a same direction as the z-axis; and if the first vector projection is negative, it is determined that the first displacement points in a direction opposite to the z-axis.

5. The method of claim 2, wherein the determining the relationship between the second displacement of the control point and the z-axis comprises:

calculating a second vector projection of the second displacement of the control point on the z-axis; and determining, based on the second vector projection, the relationship between the second displacement of the control point and the z-axis, wherein:

if the second vector projection is positive, it is determined that the second displacement points in a same direction as the z-axis; and if the second vector projection is negative, it is determined that the second displacement points in direction opposite to the z-axis.

6. The method of claim 4, wherein the calculating the first vector projection of the first displacement of the control point on the z-axis comprises:

calculating the first displacement of the control point before and after the rotation in a base coordinate system;

acquiring a vector expression of the z-axis in the base coordinate system; and acquiring a dot product of the first displacement and the vector expression of the z-axis to obtain the first vector projection of the first displacement in the z-axis.

7. The method of claim 5, wherein, the calculating the second vector projection of the second displacement of the control point on the z-axis comprises:

calculating the second displacement of the control point before and after the rotation in the base coordinate system;

acquiring a vector expression of the z-axis in the base coordinate system; and acquiring a dot product of the second displacement and the vector expression of the z-axis to obtain the second vector projection of the second displacement in the z-axis.

8. The method of claim 1, wherein when the control point is located within the surface to be aligned, the determining, based on the relationship between the first displacement and the z-axis, whether the current rotation direction is the correct alignment direction to obtain the first determination result comprises:

determining, if the first displacement points in a same direction as the z-axis point, the current rotation direction as the correct alignment direction; and determining, if the first displacement points in a direction opposite to the z-axis, the current rotation direction as a wrong alignment direction.

9. The method of claim 2, wherein when the control point is located within the surface to be aligned, the determining, based on the relationship between the second displacement and the z-axis, whether the current rotation direction is the correct alignment direction to obtain the second determination result comprises:

determining, if the second displacement points in a same direction as the z-axis point, the current rotation direction as the correct alignment direction; and determining, if the second displacement points in a direction opposite to the z-axis point, the current rotation direction as a wrong alignment direction.

10. The method of claim 2, wherein the determining whether the surface to be aligned is aligned with the target object comprises:

presetting a distance threshold related to a size of the surface to be aligned and a position where the control point is selected;

acquiring, during the rotation, a lowest point of the control point having a lowest projection in the z-axis; and comparing current coordinates of the control point with the lowest point, and wherein when a position deviation between the control point and the lowest point is less than or equal to the distance threshold, the surface to be aligned is aligned with the target object.

11. The method of claim 1, wherein the acquiring the first displacement of the control point comprises:

presetting a first threshold related to a size of the surface to be aligned and a position where the control point is selected; and acquiring, when a position deviation of the control point before and after the rotation is greater than or equal to the first threshold, the first displacement during the rotation.

12. The method of claim 2, wherein the acquiring, based on the first determination result, the second displacement of the control point during the rotation of the surface to be aligned comprises:

presetting a first threshold related to a size of the surface to be aligned and a position where the control point is selected; and acquiring, when a position deviation of the control point before and after the rotation is greater than or equal to the first threshold, the second displacement during the rotation.

13. A robot comprising a processor and a memory having a computer program stored thereon, wherein a method for aligning a robot end with a target object is implemented when the processor executes the computer program, the method comprising-:

acquiring a target direction for a surface to be aligned of the robot end;

selecting a point having a known position with respect to the surface to be aligned as a control point, and establishing a coordinate system of the control point having an x-axis, a y-axis and a z-axis;

controlling the surface to be aligned to move along a direction such that the z-axis of the coordinate system points in the target direction;

acquiring force information of the robot end, and determining whether the surface to be aligned is in contact with the target object;

rotating, when the surface to be aligned is determined to be in contact with the target object based on the force information, the surface to be aligned with respect to the target object actively and keeping the surface to be aligned in contact with the target object, and acquiring a first displacement of the control point during this process;

determining a relationship between the first displacement of the control point and the z-axis;

determining, based on the relationship between the first displacement and the z-axis, whether a current rotation direction is a correct alignment direction to obtain a first determination result; and controlling, based on the first determination result, the surface to be aligned to be rotated.

14. A non-transitory computer readable storage medium on which a computer program is stored, wherein the computer program, when executed by a processor, a method for aligning a robot end with a target object is implemented, the method comprising:

acquiring a target direction for a surface to be aligned of the robot end;

selecting a point having a known position with respect to the surface to be aligned as a control point, and establishing a coordinate system of the control point having an x-axis, a y-axis and a z-axis;

controlling the surface to be aligned to move along a direction such that the z-axis of the coordinate system points in the target direction;

acquiring force information of the robot end, and determining whether the surface to be aligned is in contact with the target object;

rotating, when the surface to be aligned is determined to be in contact with the target object based on the force information, the surface to be aligned with respect to the target object actively and keeping the surface to be aligned in contact with the target object, and acquiring a first displacement of the control point during this process;

determining a relationship between the first displacement of the control point and the z-axis;

determining, based on the relationship between the first displacement and the z-axis, whether a current rotation direction is a correct alignment direction to obtain a first determination result; and controlling, based on the first determination result, the surface to be aligned to be rotated.

* * * * *